(12) United States Patent
Abifaker

(10) Patent No.: US 8,909,553 B2
(45) Date of Patent: Dec. 9, 2014

(54) PAYMENT CARD TERMINAL FOR MOBILE PHONES

(75) Inventor: Basil Munir Abifaker, San Diego, CA (US)

(73) Assignee: Transaction Wireless, Inc., San Diego, CA (US)

( * ) Notice: Subject to any disclaimer, the term of this patent is extended or adjusted under 35 U.S.C. 154(b) by 1419 days.

(21) Appl. No.: 11/851,364

(22) Filed: Sep. 6, 2007

(65) Prior Publication Data

US 2008/0059375 A1 Mar. 6, 2008

Related U.S. Application Data

(60) Provisional application No. 60/842,873, filed on Sep. 6, 2006.

(51) Int. Cl.

| | |
|---|---|
| G06Q 20/00 | (2012.01) |
| G06Q 30/00 | (2012.01) |
| G06Q 40/00 | (2012.01) |
| G06Q 20/04 | (2012.01) |
| H04M 1/00 | (2006.01) |
| G06Q 20/32 | (2012.01) |
| G06Q 20/40 | (2012.01) |
| G06Q 30/06 | (2012.01) |

(52) U.S. Cl.
CPC ............. *G06Q 20/04* (2013.01); *H04M 1/00* (2013.01); *G06Q 20/32* (2013.01); *G06Q 20/3221* (2013.01); *G06Q 20/325* (2013.01); *G06Q 20/3255* (2013.01); *G06Q 20/327* (2013.01); *G06Q 20/40* (2013.01); *G06Q 30/06* (2013.01)
USPC ......... 705/41; 705/16; 705/14.64; 705/14.65; 705/64; 705/67; 705/35; 705/37; 705/39; 455/568

(58) Field of Classification Search
None
See application file for complete search history.

(56) References Cited

U.S. PATENT DOCUMENTS

| 5,708,422 A | * | 1/1998 | Blonder et al. | ............... | 340/5.41 |
| 6,594,647 B1 | * | 7/2003 | Randle et al. | ................... | 705/77 |

(Continued)

FOREIGN PATENT DOCUMENTS

| JP | 2004-287997 | 10/2004 |
| KR | 10-2003-038349 | 5/2003 |

(Continued)

OTHER PUBLICATIONS

Carlo Longino, More on Mobile Fulfillment, internet web page, last retrieved from http://mobhappy.com/blog1/2006/08/16/more-on-mobile-fulfillment/ on Jul. 10, 2007.

*Primary Examiner* — Gregory Johnson
(74) *Attorney, Agent, or Firm* — Mintz Levin Cohn Ferris Glovsky and Popeo, P.C.

(57) ABSTRACT

Methods and apparatus, including computer program products, for payment card terminals for mobile phones. In general, data characterizing a payment card and a settlement amount for a transaction may be received, where the data is user-generated input and is received at a mobile phone associated with a mobile phone number. Wireless transmission of data characterizing a request to provide a payment card settlement service of a merchant account of a merchant account provider for the transaction may be initiated, where the wireless transmission is to be from the mobile phone over a carrier data network to an application server. Data characterizing authorization of settlement of the transaction with the payment card may be wirelessly received by the mobile phone from the application server.

17 Claims, 6 Drawing Sheets

(56) References Cited

U.S. PATENT DOCUMENTS

| | | | |
|---|---|---|---|
| 6,609,654 B1* | 8/2003 | Anderson et al. | 235/379 |
| 6,685,093 B2 | 2/2004 | Challa et al. | |
| 6,736,322 B2 | 5/2004 | Gobburu et al. | |
| 7,006,993 B1 | 2/2006 | Cheong et al. | |
| 7,028,906 B2 | 4/2006 | Challa et al. | |
| 7,070,103 B2 | 7/2006 | Melick et al. | |
| 7,093,761 B2* | 8/2006 | Smith et al. | 235/462.07 |
| 7,184,747 B2* | 2/2007 | Bogat | 455/406 |
| 7,209,903 B1 | 4/2007 | Mamdani et al. | |
| 7,240,843 B2 | 7/2007 | Paul et al. | |
| 7,353,208 B1* | 4/2008 | Stambaugh | 705/59 |
| 7,587,039 B1* | 9/2009 | Koch | 379/211.01 |
| 7,991,694 B2* | 8/2011 | Takayama | 705/41 |
| 8,352,360 B2* | 1/2013 | De Judicibus et al. | 705/39 |
| 8,584,937 B1* | 11/2013 | Kowalchyk et al. | 235/380 |
| 2001/0001856 A1* | 5/2001 | Gould et al. | 705/39 |
| 2001/0007983 A1* | 7/2001 | Lee | 705/69 |
| 2001/0054003 A1 | 12/2001 | Chien et al. | |
| 2002/0004374 A1 | 1/2002 | Kantola et al. | |
| 2002/0004746 A1 | 1/2002 | Ferber et al. | |
| 2002/0035474 A1* | 3/2002 | Alpdemir | 704/270 |
| 2002/0035539 A1* | 3/2002 | O'Connell | 705/39 |
| 2002/0065713 A1 | 5/2002 | Awada et al. | |
| 2002/0077974 A1* | 6/2002 | Ortiz | 705/39 |
| 2002/0082961 A1* | 6/2002 | Abrahm et al. | 705/35 |
| 2002/0082986 A1* | 6/2002 | Lu | 705/39 |
| 2002/0091569 A1 | 7/2002 | Kitaura et al. | |
| 2002/0095333 A1 | 7/2002 | Jokinen et al. | |
| 2002/0128903 A1 | 9/2002 | Kernahan | |
| 2002/0181710 A1* | 12/2002 | Adam et al. | 380/270 |
| 2002/0194121 A1* | 12/2002 | Takayama | 705/39 |
| 2002/0198777 A1 | 12/2002 | Yuasa | |
| 2003/0004808 A1 | 1/2003 | Elhaoussine et al. | |
| 2003/0018524 A1* | 1/2003 | Fishman et al. | 705/14 |
| 2003/0046094 A1* | 3/2003 | Singh et al. | 705/1 |
| 2003/0055675 A1* | 3/2003 | Klein Twennaar | 705/1 |
| 2003/0058261 A1 | 3/2003 | Challa et al. | |
| 2003/0061154 A1* | 3/2003 | Chacko | 705/39 |
| 2003/0074259 A1 | 4/2003 | Slyman et al. | |
| 2003/0078895 A1* | 4/2003 | MacKay | 705/64 |
| 2003/0101134 A1* | 5/2003 | Liu et al. | 705/39 |
| 2003/0120593 A1* | 6/2003 | Bansal et al. | 705/39 |
| 2003/0144035 A1 | 7/2003 | Weinblatt et al. | |
| 2003/0220839 A1 | 11/2003 | Nguyen | |
| 2003/0233276 A1 | 12/2003 | Pearlman et al. | |
| 2003/0236728 A1* | 12/2003 | Sunderji et al. | 705/35 |
| 2004/0019564 A1* | 1/2004 | Goldthwaite et al. | 705/44 |
| 2004/0030601 A1* | 2/2004 | Pond et al. | 705/16 |
| 2004/0059660 A1* | 3/2004 | Michael | 705/36 |
| 2004/0078332 A1* | 4/2004 | Ferguson et al. | 705/41 |
| 2004/0087339 A1* | 5/2004 | Goldthwaite et al. | 455/558 |
| 2004/0107170 A1* | 6/2004 | Labrou et al. | 705/64 |
| 2004/0118914 A1 | 6/2004 | Smith et al. | |
| 2004/0122685 A1* | 6/2004 | Bunce | 705/1 |
| 2004/0127256 A1* | 7/2004 | Goldthwaite et al. | 455/558 |
| 2004/0128197 A1 | 7/2004 | Bam et al. | |
| 2004/0148252 A1* | 7/2004 | Fleishman | 705/39 |
| 2004/0230489 A1* | 11/2004 | Goldthwaite et al. | 705/26 |
| 2004/0230536 A1* | 11/2004 | Fung et al. | 705/64 |
| 2004/0240631 A1* | 12/2004 | Broman et al. | 379/88.02 |
| 2004/0267618 A1* | 12/2004 | Judicibus et al. | 705/16 |
| 2005/0027543 A1* | 2/2005 | Labrou et al. | 705/1 |
| 2005/0029358 A1 | 2/2005 | Mankins | |
| 2005/0033635 A1 | 2/2005 | Jeon | |
| 2005/0097015 A1* | 5/2005 | Wilkes et al. | 705/30 |
| 2005/0102188 A1* | 5/2005 | Hutchison et al. | 705/26 |
| 2005/0131761 A1 | 6/2005 | Trika et al. | |
| 2005/0187873 A1* | 8/2005 | Labrou et al. | 705/40 |
| 2005/0246196 A1 | 11/2005 | Frantz et al. | |
| 2005/0250538 A1* | 11/2005 | Narasimhan et al. | 455/558 |
| 2005/0256802 A1* | 11/2005 | Ammermann et al. | 705/44 |
| 2005/0273392 A1 | 12/2005 | Ahn | |
| 2006/0000900 A1* | 1/2006 | Fernandes et al. | 235/380 |
| 2006/0011728 A1 | 1/2006 | Frantz et al. | |
| 2006/0016884 A1 | 1/2006 | Block et al. | |
| 2006/0020540 A1* | 1/2006 | Cramer | 705/39 |
| 2006/0026070 A1 | 2/2006 | Sun | |
| 2006/0031153 A1* | 2/2006 | Kim | 705/37 |
| 2006/0036491 A1 | 2/2006 | Leung et al. | |
| 2006/0047576 A1* | 3/2006 | Aaltonen et al. | 705/26 |
| 2006/0085260 A1 | 4/2006 | Yamagishi | |
| 2006/0098792 A1* | 5/2006 | Frank et al. | 379/70 |
| 2006/0106699 A1* | 5/2006 | Hitalenko et al. | 705/35 |
| 2006/0111967 A1 | 5/2006 | Forbes | |
| 2006/0149628 A1 | 7/2006 | Chefalas et al. | |
| 2006/0165060 A1* | 7/2006 | Dua | 370/352 |
| 2006/0178932 A1 | 8/2006 | Lang | |
| 2006/0204051 A1* | 9/2006 | Holland, IV | 382/115 |
| 2006/0219774 A1* | 10/2006 | Benco et al. | 235/380 |
| 2006/0224470 A1* | 10/2006 | Garcia Ruano et al. | 705/27 |
| 2006/0265281 A1 | 11/2006 | Sprovieri et al. | |
| 2006/0287004 A1* | 12/2006 | Fuqua | 455/558 |
| 2006/0289631 A1* | 12/2006 | Stretch et al. | 235/380 |
| 2007/0011099 A1* | 1/2007 | Sheehan | 705/65 |
| 2007/0022008 A1* | 1/2007 | Kingsborough et al. | 705/14 |
| 2007/0027803 A1* | 2/2007 | Brandes et al. | 705/39 |
| 2007/0027816 A1* | 2/2007 | Writer | 705/65 |
| 2007/0063842 A1 | 3/2007 | Sprogis | |
| 2007/0078760 A1* | 4/2007 | Conaty et al. | 705/39 |
| 2007/0088610 A1 | 4/2007 | Chen | |
| 2007/0094097 A1* | 4/2007 | Owurowa et al. | 705/26 |
| 2007/0094113 A1* | 4/2007 | Chapeta | 705/35 |
| 2007/0106564 A1* | 5/2007 | Matotek et al. | 705/26 |
| 2007/0136197 A1* | 6/2007 | Morris | 705/44 |
| 2007/0150339 A1 | 6/2007 | Retter et al. | |
| 2007/0156513 A1 | 7/2007 | Mastrianni et al. | |
| 2007/0156517 A1 | 7/2007 | Kaplan et al. | |
| 2007/0174120 A1* | 7/2007 | Asmar et al. | 705/14 |
| 2007/0270125 A1 | 11/2007 | Pousti | |
| 2008/0017706 A1* | 1/2008 | Malik | 235/383 |
| 2008/0040274 A1* | 2/2008 | Uzo | 705/44 |
| 2008/0140569 A1* | 6/2008 | Handel | 705/44 |
| 2008/0147546 A1* | 6/2008 | Weichselbaumer et al. | 705/41 |
| 2008/0172306 A1 | 7/2008 | Schorr et al. | |
| 2008/0189186 A1* | 8/2008 | Choi et al. | 705/26 |
| 2008/0208742 A1 | 8/2008 | Arthur et al. | |
| 2008/0232590 A1* | 9/2008 | Rivest et al. | 380/277 |
| 2008/0255942 A1 | 10/2008 | Craft | |
| 2009/0006234 A1* | 1/2009 | Han et al. | 705/35 |
| 2009/0094125 A1* | 4/2009 | Killian et al. | 705/17 |
| 2009/0119190 A1* | 5/2009 | Realini | 705/30 |
| 2009/0182588 A1* | 7/2009 | Ashby et al. | 705/5 |
| 2009/0197584 A1* | 8/2009 | Snow et al. | 455/418 |
| 2011/0313867 A9* | 12/2011 | Silver | 705/15 |
| 2012/0022930 A1* | 1/2012 | Brouhard | 705/14.22 |
| 2012/0097739 A1* | 4/2012 | Babu et al. | 235/380 |

FOREIGN PATENT DOCUMENTS

| | | |
|---|---|---|
| KR | 10-2003-038351 | 5/2003 |
| KR | 10-2003-084000 | 11/2003 |
| KR | 10-2004-003750 | 1/2004 |
| KR | 10-2004-010092 | 1/2004 |
| KR | 10-2004-091822 | 11/2004 |
| KR | 10-2005-019310 | 3/2005 |
| KR | 10-2005-083178 | 8/2005 |
| WO | WO 0003328 | 1/2000 |

* cited by examiner

PAYMENT CARD TERMINAL FOR MOBILE PHONES

CROSS REFERENCE TO RELATED APPLICATIONS

This application claims the benefit of U.S. Provisional patent application entitled "CREDIT CARD TERMINAL FOR MOBILE PHONES", filed Sep. 6, 2006, Application Ser. No. 60/842,873, the contents of which are hereby fully incorporated by reference.

BACKGROUND

The present disclosure relates to data processing by digital computer, and more particularly to payment card terminals for mobile phones.

Payment cards, such as credit cards, may provide a form of payment for a particular merchant that may be used at a point of sales. For example, a credit card issuer may issue a credit card that may be used at merchants associated with a processor to settle a transaction. For example, a shopper may try to purchase clothing from a retailer by using a payment card, where the payment card may be swiped through a point of sales terminal. At the retailer, backend systems (e.g., by connecting to a processor of a payment card) may determine whether the transaction may be settled with the payment card.

SUMMARY

The subject matter disclosed herein provides methods and apparatus, including computer program products, that implement techniques related to payment card terminals for mobile phones.

In a general aspect, first data characterizes a payment card and a settlement amount for a transaction generated by user input is received at a mobile phone associated with a mobile phone number. Wireless transmission of second data characterizing a request to provide a payment card settlement service of a merchant account of a merchant account provider for the transaction is initiated, where the wireless transmission is to be from the mobile phone over a carrier data network to an application server. Third data characterizing authorization of settlement of the transaction with the payment card is wirelessly received by the mobile phone from the application server.

In a related aspect, first data characterizing a request to provide a payment card settlement service to a mobile phone being associated with a mobile phone number is received from a mobile phone, through a wireless carrier data network, at an application server. The request characterizes a payment card with which to settle a transaction and merchant account information of a merchant account. The application server accesses a merchant account provider server to obtain processing of the request for the merchant account based on the merchant account information, which includes a mobile phone number. Second data characterizing authorization to settle the transaction with the payment card for the merchant account is received at the application server from the merchant account provider server. Wireless transmission of third data characterizing authorization for the settlement is initiated by the application server, where the third data is to be wirelessly transmitted through the wireless carrier data network to the mobile phone.

In a related aspect, a middleware server receives payment requests initiated by mobile phones, where the mobile phones operate on a plurality of heterogeneous wireless communication networks. Each payment request is associated with a merchant account provider server. Formats of the payment requests are converted to formats of the corresponding merchant account provider server. The converted payment requests are transmitted to the corresponding merchant account providers. Authorizations for at least one of the payment requests are received from at least one of the corresponding merchant account providers. The authorizations are associated with mobile phones corresponding to the authorizations. Compatible notifications are generated for each of the authorizations. Wireless transmission of the notifications to the corresponding mobile phones is initiated.

In a related aspect, authorizing a credit card transaction with a mobile phone may include receiving credit card information, transmitting the credit card information and merchant account information to a server, and, in response to receiving an authorization, displaying an authorization on a display of the mobile phone.

In a related aspect, communication between mobile phones and merchant account providers includes receiving a request from a mobile phone for credit card authorization, where the request includes credit card information and merchant account information. A merchant account provider from which to request authorization is determined. Authorization is requested from the merchant account provider, where the request includes credit card information and merchant account information. An authorization is sent to the mobile phone if authorization is received from the merchant account provider.

The subject matter may be implemented as, for example, computer program products (e.g., as source code or compiled code tangibly embodied in computer-readable media), computer-implemented methods, and systems.

Variations may include one or more of the following features.

Operations of an application server may be implemented as a middleware application.

An application server may communicate over a connection in accordance with the Transmission Control Protocol and the Secure Sockets Layer protocol with a merchant account provider server.

An application server may communicate over a connection in accordance with the Transmission Control Protocol and the Secure Sockets Layer protocol with a mobile phone.

A mobile phone may have a client application to initiate requests for settlement on an operating system in accordance with BINARY RUNTIME ENVIRONMENT FOR WIRELESS.

An electronic receipt of an authorization of settlement may be sent to a mobile phone number or an electronic mail address (e.g., a client application may automatically send receipts to cardholders or a middleware server may send electronic receipts). Electronic receipts may be accessible at a web site.

Merchant account information may include authentication data.

A mobile phone may require authorization with a personal identifying number. Data characterizing a request to view a merchant account at a web site may be received, where the request includes authentication data such as a personal identifying number and a mobile phone number. Access to view a merchant account may be provided based on authentication data providing authentication to view the merchant account.

Data characterizing a request to provide a refund for a transaction may be received. An account provider may be accessed to obtain processing of the request to provide a refund. Data characterizing completion of a refund may be received and data characterizing the refund may be transmitted.

An application server may initiate wireless transmission of a request to authorize settlement of a transaction with the payment card, where the request is to be transmitted in accordance with a wireless mobile phone messaging protocol to the mobile phone. The application server may receive a message generated by a mobile phone authorizing settlement of the transaction. Initiating wireless transmission of data characterizing authorization of a transaction may be based on receiving the message authorizing the settlement of the transaction from another mobile phone at an application server.

A client application may be available for over-the-air download to a mobile phone.

In response to receiving a message authorizing settlement of a transaction at an application server, a response may be transmitted to a client application on the mobile phone. For example, the exact message may be relayed, or, a different response message may be sent. For example, an authorization and transaction identifier (e.g., associated with the middleware server) may be sent as a response. The server may log the transaction and generate a receipt that is sent to payment card holders electronically. An authorization code sent to a merchant as part of an authorization may be used to log transactions (e.g., in case the phone loses battery power, or if a merchant prefers a written log of transactions).

The subject matter described herein can be implemented to realize one or more of the following advantages. Merchants (e.g., mobile merchants) may be allowed to input payment card information and obtain immediate authorization to perform payment card transactions using their existing wireless device. The wireless device may, at the least, be a consumer handset, which has a minimal amount of resources (e.g., processing power, limited input capability (e.g., twelve-button keypad, and no QWERTY-keypad or stylus input)). Thus, merchants need not purchase expensive wireless credit card machines or specialized devices having specialized software, hardware, or both. In addition, to decrease resource usage by a client application, specialized hardware need not be supported (e.g., a driver for a credit card magnetic reader need not exist). By allowing for input via a mobile phone and providing electronic receipts, a client application may allow for entirely wireless transactions. Also, payment card transactions may be approved wirelessly. This may allow merchants to operate wirelessly or be mobile. For example, merchants in a stand at a mall need not have access to a phone line to perform credit card transactions. As another example, a door-to-door salesman may perform credit card transactions at a residence of a customer. A combination of measures may be taken that may result in little or no information being stored on a mobile phone such that privacy concerns may be assuaged. As examples, little or no transaction data may be stored; upon de-activation of a client application (e.g., due to loss or removal of a former employee sub-account), transaction data and client application configuration data may be wirelessly deleted; communication of sensitive data may always be in accordance with the Secure Sockets Layer protocol; and the like.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
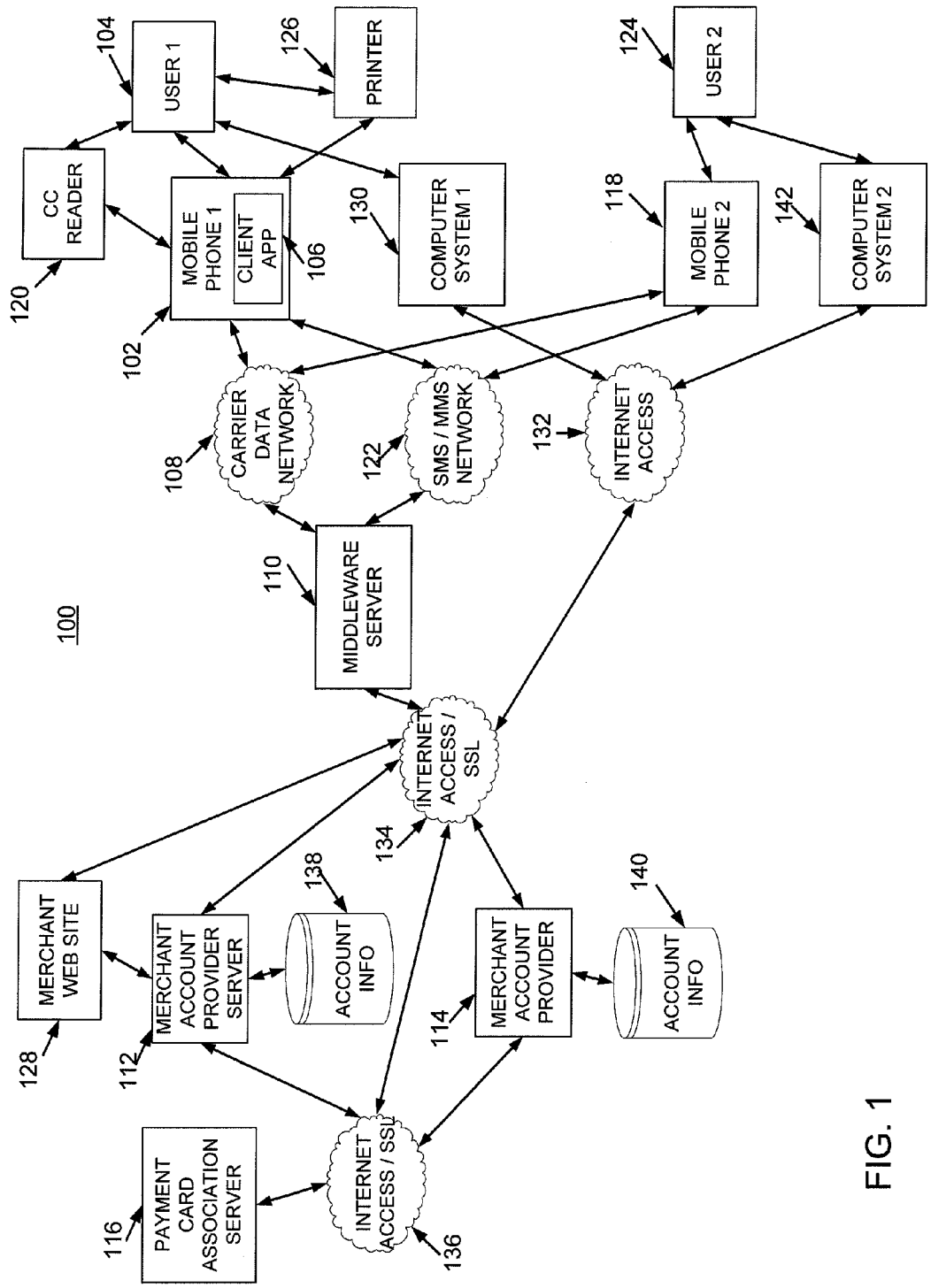
FIG. 1 is a block diagram of a system to process a settlement including a mobile phone and a merchant account provider.

FIG. 1 is a block diagram of a system 100 to process a settlement including a mobile phone 102 and merchant account provider servers 112, 114. Throughout FIG. 1 arrows represent connections that may be made between components (e.g., through communication). Although FIG. 1 includes different clouds representing internet access, each cloud does not necessarily represent a different type of internet access and different clouds may be used to make connections easier to interpret.

In general, a user 104 may interact with have a first mobile phone 102 to request settlement of a transaction (e.g., for goods, services, or both) through a client application 106. The client application 106 of the first mobile phone 102 may send a request for settlement of the transaction through the carrier data network 108 to a middleware server 110. The middleware server 110 may process the request and obtain processing of the settlement by contacting one of the merchant account providers 112, 114, which may contact a payment card association server 116. The payment card association server 116 may authorize the transaction, which may cause an authorization message to be sent to the one of the merchant account providers 112, 114 that the middleware server 110 contacted. A message confirming authorization may be sent to the middleware server 110 based on the authorization (e.g., as a transmission control protocol (TCP) message including an authorization code). In addition, a merchant account associated with the first user 102 may be credited based on the authorization. The middleware server 110 may send a message to the client application 106 of the first mobile phone 102 confirming authorization. Then, the client application 106 may cause the first mobile phone 102 to display a notification indicating authorization.

If a transaction is not authorized, a message denying authorization may similarly be sent from the payment card association server 116 to the one of the merchant account providers 112, 114 that the middleware server 110 contacted, the merchant account might not be credited, the one of the merchant account providers 112, 114 that the middleware server 110 contacted may receive a message denying authorization, a message denying authorization may be sent from the middleware server 110 to the client application 106, and the client application 106 may cause the first mobile phone 102 to display a message indicating authorization was denied.

The first and second mobile phones 102, 118 are mobile devices that may be associated with mobile phone numbers. The mobile phones 102, 118 may operate wirelessly through a carrier network that may provide data services and may further provide voice services. The client application 106 is an application that may run on the operating system of the mobile phone 102. The mobile phones 102, 118 may have a limited interface, such as a twelve-button telephone keypad, navigation soft keys, and limited screen real estate. The carriers of the mobile phones 102, 118 may support wireless protocols such as CDMA (code division multiple access), EV-DO (evolution-data only), GSM (global system for mobile communications), GPRS (general packet radio service), EDGE (enhanced data rates for global evolution), and the like.

To support the client application 106, the first mobile phone 102 may be required to support SSL (Secure Sockets Layer) APIs (application programming interfaces). Also, the device may be required to be data enabled and be able to connect to the Internet (e.g., via TCP). For example, to communicate with a middleware server, a client application may generate a TCP socket to the server which is encrypted using SSL. The physical requirements may be minimal, such as a 120×120 screen size, 1 Megabyte of flash memory, and a standard twelve-button telephone keypad.

The mobile phones 102, 118 may include an operating system optimized for mobile phones (e.g., based on inherent limitations of a mobile phone such as a standard telephone twelve-button keypad and limited hardware resources), which may further be carrier and device-agnostic, such as BINARY RUNTIME ENVIRONMENT FOR WIRELESS (BREW) or JAVA 2 PLATFORM, MICRO EDITION (J2ME). The client application 106 may be implemented for the operating system of the mobile phones. By implementing the client application 106 in an operating environment with limited resource requirements (e.g., memory size and processor power), hardware and software resource requirements may be lower, such that devices that have limited resources may use the client application 106. For example, typical mobile phones that tend to have limited resources and be less-expensive may be used, instead of requiring more specialized hardware and software that may require the use of devices that tend to have more resources and tend to be more expensive, such as a POCKET PERSONAL COMPUTER phone. In addition, as people tend to already have a mobile phone with limited capabilities, additional devices need not be purchased. Also, data plans (or additional data plans) need not be purchased. For example, cell phones might not require a data plan whereas PDA (personal digital assistant)-style devices may require a data plan for data connectivity.

To set up the client application 106 for use on the first mobile phone 102, the client application may be downloaded over-the-air (e.g., through a WAP (WIRELESS APPLICATION PROTOCO)-enabled web site link sent with an MMS (Multimedia Messaging Service) message or through a mobile phone application store such as VERIZON's GET-IT-NOW). Then, the client application 106 may be installed (e.g., automatically as part of a download process). In addition, setting up the client application 106 may involve entering merchant account information that may be used when making requests for settlement. For example, setting up the client application 106 may involve entering a PIN (personal identifying number) code associated with a merchant account that may be used to authenticate the first user 104. The services of the client application 106 in conjunction with the middleware server 110 may be offered on a subscription basis (and, e.g., billed monthly to a wireless bill).

To interact with the client application 106, the first user 104 may use buttons, such as a keypad (e.g., a twelve-button keypad or a QWERTY keypad) and soft keys of the first mobile phone 102, or accessories that may be configured to work with the first mobile phone 102, such as a credit card reader 120 (e.g., accessories may interface with the device using BLUETOOTH or UNIVERSAL SERIAL BUS protocols). For example, to enter an account number of a payment card to be used to request settlement of a transaction, the first user 104 may use the credit card reader 120 (which may read credit cards via a magnetic strip or radio frequency identification signals) and to enter a ZIP (Zone Improvement Plan) code associated with the payment card the first user 104 may use a keypad of the mobile phone 102. The credit card reader 120 or printer 126 may require custom hardware, software, or both. For example, the credit card reader 120 may include a quarter-size dongle to read radio frequency identification signals and interface with the mobile phone 102 through a BLUETOOTH connection. Custom software may be used to populate the client application 106 of the mobile phone 102 with credit card information read from the credit card reader 120. As another example, the client application 106 may include special device drivers to connect to the printer 126.

As another example, in addition to using the client application 106 to enter information to request settlement of a transaction, the client 106 may also accept input for delivery of an electronic receipt for a cardholder. As examples, a mobile phone number or electronic mail address may be received as input and that information may be used to send an appropriate message (SMS message or electronic mail message) to the cardholder as a receipt of the transaction. Access to receipts may also be from a web browser such as, through information in an electronic mail, such as log-in information, a link, a web site address and a unique identifier associated with an electronic receipt, and the like. For example, a web site may offer receipts in ADOBE PORTABLE DOCUMENT FORMAT that may be accessed via log-in credentials from an electronic transaction confirmation sent to a consumer. By having the middleware server 110 generate electronic receipts for payment cardholders, electronic receipts may be made accessible to customers easily (e.g., as a single system may be used to store electronic receipts). By allowing for input via a mobile phone (e.g., a twelve-button keypad) and providing electronic receipts, the client application may allow for entirely wireless transactions that do not require specialized hardware.

The client application 106 may store transaction information on the first mobile phone 102 such that a merchant can review or reverse charges made throughout a period of time. For example, a limited amount of transaction identifiers, authorization codes, and amounts may be stored on the first mobile phone 102 for a certain amount of time, and that may be sufficient such that a merchant can reverse a transaction. The client application 106 may store merchant account information, such as log-in credentials, which may be used to make merchant account deposits (e.g., information for one or more merchant accounts may be stored and used during a transaction, instead of having to input the information for each transaction). As the information may be limited to the information necessary for a deposit, the storage of the information on the client device might not be a security liability.

The client application 106 may support simultaneous transactions. For example, after a request to authorize a transaction is sent, rather than wait for an authorization by hanging the mobile phone 102, the client application 106 may allow information for another transaction to be entered.

A request for settlement of a transaction from the first mobile phone 102 may include information related to a payment card and a transaction. For example, the request may include a credit card type, credit card number, credit card expiration data, CVV (card verification value code) number, ZIP code of a cardholder, street and city address of the cardholder, dollar amount of the transaction, and the like.

In addition to including amount related to a payment card and a transaction, the request may further include information related to a merchant account associated with the first user 104. For example, the request may include information to identify an account and an authentication code for authenticating the first user 104. As an example, the request may include a mobile phone number and a PIN.

In general, the first mobile phone 102 communicates with the middleware server 110 through the carrier data network 108 and the SMS (short message service)/MMS network 122. The second mobile phone 118 might not be able to communicate with the carrier data network 108 and might only be able to communicate with the middleware server 110 through the SMS/MMS network 122. As communications through the carrier data network 108 may be more secure than the SMS/MMS network 122 (e.g., as sensitive information might not be stored on a mobile phone, as an SMS outgoing message; the carrier data network 108 may involve communication in accordance a secure protocol, such as a Secure Sockets Layer protocol, whereas the SMS/MMS network 122 might not), communications that involve sensitive information, such as merchant account authentication tokens (e.g., a PIN) or payment card account numbers, may be sent through the carrier data network 108. For example, as a request for settlement of a transaction may include a merchant account authentication token such that the request may be sent from the first mobile phone 102 to the middleware server 110 through the carrier data network 108. Either of the SMS/MMS network or the carrier data network 108 may be chosen for communications based on other features of the respective networks. For example, the SMS/MMS network may be used to send receipts to a second mobile phone 118 of the second user 124 such that the second user 124 is not required to have a client application for receiving receipts.

The first mobile phone 102 may communicate with a printer 126 to print information from the mobile phone, such as receipts and lists of transactions. The first mobile phone 102 may be configured to connect to the printer using protocols such as USB or BLUETOOTH. In addition to or instead of receiving a paper receipt, the second user 124 may receive electronic receipts. For example, the middleware server 110 may send an SMS message or MMS message to the second mobile phone 118 of the second user 124, or an electronic mail that may be viewed at a second computer 142 of the second user 124.

The first user 104 may access a merchant account web site 128 to manage merchant accounts by accessing the merchant account web site 128 through a first computer system 130 and internet access 132, which is connected through the Internet to internet access 134 to the merchant account web site 128. Management of accounts may include viewing transactions, setting up a merchant account or merchant sub-accounts (each of which may be associated with separate mobile phone numbers, authentication codes, and the like), configuring an authentication code for accounts, entering into dispute resolution, generating reports of transaction data, exporting transaction data (e.g., to an accounting tool, such as INTUIT's QUICKBOOKS), and the like. To access the merchant account web site, credentials may include, as an example, a mobile phone number of the first mobile phone 102 and an authentication code used by the mobile phone 102 when requesting settlement of a transaction. To allow for merchant account management, the merchant account web site 128 is connected to the merchant account provider server 112, where the connection may allow for obtaining information about accounts, editing account information, and the like.

The middleware server 110 acts as an intermediary between the merchant account provider servers 112, 114 and the client application 106. Advantageously, by acting as an intermediary, the merchant account provider servers 112, 114 may require little or no changes such that the client application 106 may interface with the merchant account provider servers 112, 114. As part of acting as an intermediary, the middleware server 110 may receive and send communications from and to the client application 106, and send and receive communications to and from the merchant account provider servers 112, 114. The middleware server 110 may allow for the client application 106 to communicate with many different merchant account providers, which may have different protocols for requesting settlement of a transaction with a payment card (e.g., different merchant account providers may have different APIs). For example, a common format of request for settlement of a transaction may be received from the client application 106 at the middleware server 110 and the middleware server 110 may determine which of the merchant account providers 112, 114 to which the request corresponds (e.g., the merchant account provider may be determined based on information provided by the client application 106 to the middleware server 110) and generate an appropriate communication with a merchant account provider based on the determination (e.g., using one type of an API call for the first merchant account provider 112 if the request corresponds to the first merchant account provider 112 and using a second type of an API call for the second merchant account provider 114 if the request corresponds to the second merchant account provider 114).

The middleware server 110 communicates using a protocol in accordance with the SSL protocol with the merchant account provider servers 112, 114, which may be used to provide a layer of security to communications. Similarly, communication between the middleware server 110 and the first mobile phone 102 may use a protocol in accordance with the SSL protocol. For example, the SSL protocol may be used for requests for authorizations (e.g., requests to settle transactions), authorizations, and the like to provide a measure of privacy. Also, the communications between the middleware server 110 and the merchant providers 112, 114, and the communications between the middleware server 110 and the first mobile phone 102 may be in accordance with the TCP protocol.

If the first user 104 does not have a merchant account with a merchant account provider, the client application 106 may allow for the first user 104 to apply for a merchant account (e.g., through a series of dialogues and user input that mimics account-creation through a regular web browser, the dialogues and connectivity to the merchant account provider being provided by the middleware server 110).

The middleware server 110 may operate using an operating system such as LINUX or MICROSOFT WINDOWS. The middleware server 110 may be required to connect to the internet, accept incoming HTTPS (HyperText Transport Protocol Secure) requests and POST HTTPS requests from and to the internet, respectively. The middleware server may be an application server, as may be the merchant account provider servers 112, 114.

The merchant account provider servers 112, 114 are servers of respective merchant account providers. In general, merchant account providers provide accounts for merchants and may provide for settlement of a transaction with a payment card, such as a credit or debit cards. The merchant account providers may be third-party, online merchant account providers, such as VERISIGN, PAYPAL, AUTHORIZE.NET, and the like (e.g., third-party with respect to payment card institutions, such as issuers and associations), which may allow an end user to connect to an existing merchant account (e.g., a regular PAYPAL merchant account accessible through a web browsers through the middleware server 110). By being online merchant account providers, the middleware server 110 may perform internet-based processing of transactions, as an alternative to typical merchant account provider processing that requires a dial-up for a particular provider.

Advantageously, by providing connections to online merchant account providers, a client application may connect to multiple merchant account providers through a single client application and a single connection (e.g., a dedicated dial-up number need not be used for each merchant account provider). This may provide flexibility, for example, if a merchant wishes to switch to a different merchant account provider, they may use a same client application, may have previous transaction information across different account accessible from a same middleware server, and the like.

Also, as standardized protocols may be used to connect to online merchant accounts and a user interface that accepts merchant account credentials for various merchant accounts, any merchant account provider may be used. If an online merchant account providers require different access techniques, the techniques for accessing merchant account providers may be updated at the middleware server 110 and the client application 106 might be loosely configured to communicate with the middleware server 110 such that the client application 106 need not be updated (i.e., rather than having a fixed pull-down menu for selecting a merchant account provider, a text field may be provided and a search may be performed to find a matching merchant account provider).

To provide for settlement with a payment card, the merchant account providers may have an agreement with an association of payment cards, which may operate the payment card association server 116. The merchant account providers may communicate with the payment card association through their respective servers through internet access 136. The merchant account providers may communicate with payment card associations, for example, to determine whether to authorize a transaction (e.g., whether a credit card has sufficient remaining credit for an amount of a transaction), crediting and debiting of merchant accounts, and the like.

The merchant account provider servers 112, 114 have respective account information databases 138, 140 that store account information. For example, the databases 138, 140 may store a history of transactions associated with an account, authentication information to be used to authenticate an account, and the like.

Although FIG. 1 includes a certain number and type of components, implementation may vary. For example, there may be fewer or more merchant account provider servers.

As another example, there may be additional payment card associations.

As another example, mobile devices other than a mobile phone, such as multifunction consumer mobile handsets that may be purchased off the shelf may be used instead of the mobile phone 102.

As another example, each of the merchant account provider servers may have a respective merchant web site.

As another example, the middleware server might store information detailing subscriptions to client applications that request settlement services of the middleware server such that, for example, the middleware server may deny services to accounts to which subscriptions have lapsed.

As another example, transaction data may be stored electronically, which may avoid, or reduce, use of paper receipts, printers for receipts, and the like. The transaction data may be stored on the first mobile phone 102, at the middleware server 110, at some combination of both, or elsewhere. For example, ten most-recent transactions may be stored at both the mobile phone 102 and the middleware server 110, and the middleware server 110 may store older transactions. For example, the middleware server 110 may store all transaction data and that data may be used to provide account information to a merchant (e.g., a summary of transactions). The transaction data that is stored might not include sensitive information, such as payment card account numbers, CVV numbers, and the like, or, may only be a limited amount of information, such that payment card account information tends to be held more securely. For example, credit card information may only be used to get an authorization code and then the information may be discarded. Or, only the last for digits of a credit card may be stored for card identification. Transaction information that is stored may include transaction identifiers, authorization codes, and amounts, which may be sufficient to reverse a transaction.

As another example, there need not be internet access be the middleware server 110 and the merchant account provider server 112.

As another example, features of the middleware server 110 may be merged with the merchant account provider servers 112, 114 (e.g., the merchant account provider server 112 may communicate with the carrier data network 108; connect to mobile phones via transmission control protocol, authorize a transaction, and issue electronic receipts to the phones).

As another example, there may be many instances of the client application 106, and instances may use different carrier data networks.

As another example, as part of a process of settling a transaction, a customer (e.g., the second user 124) of a merchant (e.g., the first user 104) may receive a message (e.g., an SMS or MMS message including text identifying an amount of a transaction may be generated by the middleware server 110) at a mobile phone requesting confirmation of a charge to a payment card. To confirm a charge, the customer may send a response to the sender of the message (e.g., which may include keywords, such as "OK" or "Yes"). For example, the second user 124 may be a cardholder of a payment card whose information, including for example an account number and phone number, is entered into the client application of the first mobile phone 102. Then, the client application may send a request to settle a transaction with the payment card to the middleware server 110 which may request authorization from the merchant account provider server 112. In response to receiving authorization, the middleware server 110 may send an SMS message to the second mobile phone 118 over the SMS/MMS network 122. The message may include a description of the transaction and a message requesting to "reply with the keyword 'yes' to complete the transaction." The second user 124 may use the second mobile phone 118 to reply to the message over the SMS/MMS network 122, and the reply may be received at the middleware server 110. Then, the middleware server 110 may send a message indicating completion of the transaction to the client application 106. A confirmation of payment by a cardholder may also be used as an opportunity for entering of PINs or other authentication codes of a cardholder (e.g., a PIN number of a debit card may be entered in a reply message or as part of a response involving an IVR (interactive voice response) system).

As another example, in response to a request to de-activate the client application 106 (e.g., due to loss or removal of a former employee sub-account), transaction data and client application configuration data may be wirelessly deleted. For example, the first user 104 may contact an administrator of the middleware server 110, who may use the middleware server 110 to send a deactivation message to the client application 106. Then, the client application 106 may delete a log of transaction data and configuration data (e.g., a PIN of a merchant), and may further effectively disable the client application 106.

FIGS. 2A-2G include user interfaces that may be displayed on a mobile phone and may be generated by a client application of a mobile phone, such as the client application 106 of FIG. 1.

Figure 2A:
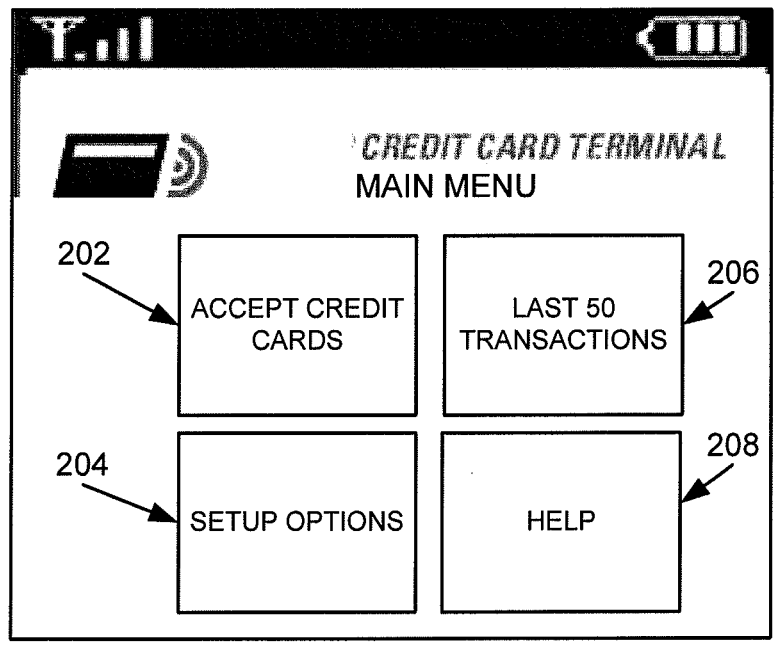
FIG. 2A is a diagram illustrating a user interface from which to manage settlement with a payment card through a mobile phone.

FIG. 2A is a diagram illustrating a user interface from which to manage settlement with a payment card through a mobile phone. In particular, the user interface of FIG. 2A includes a menu of options that may be a menu from which to reach other user interfaces such as the user interfaces of FIGS. 2B, 2D, and 2G. The options are provided through the user interface of FIG. 2A by a first selection area 202 for accepting credit cards as a form of payment card, a second selection area 204 for setting up options of a client application, a third selection area 206 for managing a last fifty transactions, and a fourth selection area 208 for viewing help contents. Navigation between the options may handled, for example, by navigation arrows of a navigation control area of a keypad which may respond by highlighting an area of the user interface that may be selected by pressing an OK button of a navigation control area.

Figure 2B:
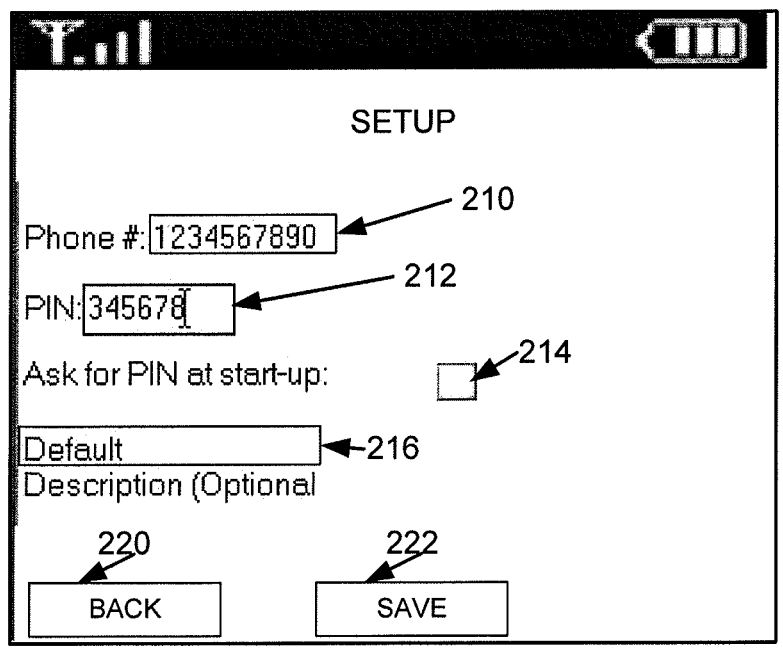
FIG. 2B is a diagram illustrating a user interface from which to setup a client application from which to manage settlement with a payment card through a mobile phone.

FIG. 2B is a diagram illustrating a user interface from which to setup a client application from which to manage settlement with a payment card through a mobile phone. The user interface includes a combination of text fields, a check box, and soft buttons that may be used to edit a configuration of the client application. In particular, a first text field 210 may be used to enter a phone number, a second text field 212 may be used to enter a PIN, a checkbox 214 may be used to indicate whether a PIN is to be requested at start-up of the client application or to automatically use the PIN, and a fourth text field 216 may be used to enter a description of a merchant provider account for the phone number and PIN. Soft buttons may be used to return to a previous user interface (e.g., the user interface of FIG. 2A) by a "back" soft button 220 or to save a configuration by a "save" soft button 222. A twelve-button keypad in combination with soft buttons of a mobile phone may be used to interact with the user interface components of FIG. 2B.

Figure 2C:
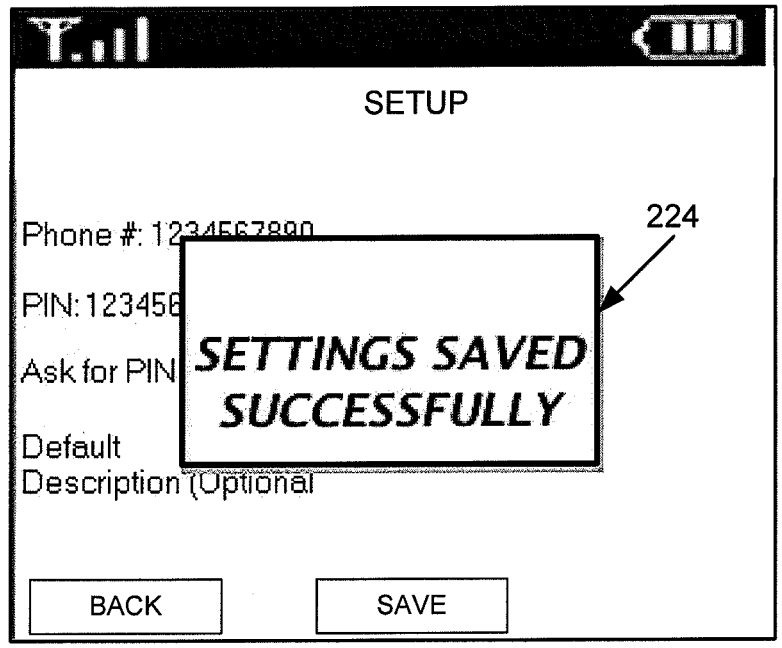
FIG. 2C is a diagram illustrating a user interface providing notification of acceptance of settings for a client application from which to manage settlement with a payment card through a mobile phone.

FIG. 2C is a diagram illustrating a user interface providing notification of acceptance of settings for a client application from which to manage settlement with a payment card through a mobile phone. The user interface of FIG. 2C may be the same as the user interface of FIG. 2B with the addition of a dialog box 224 indicating that settings have been saved.

Figure 2D:
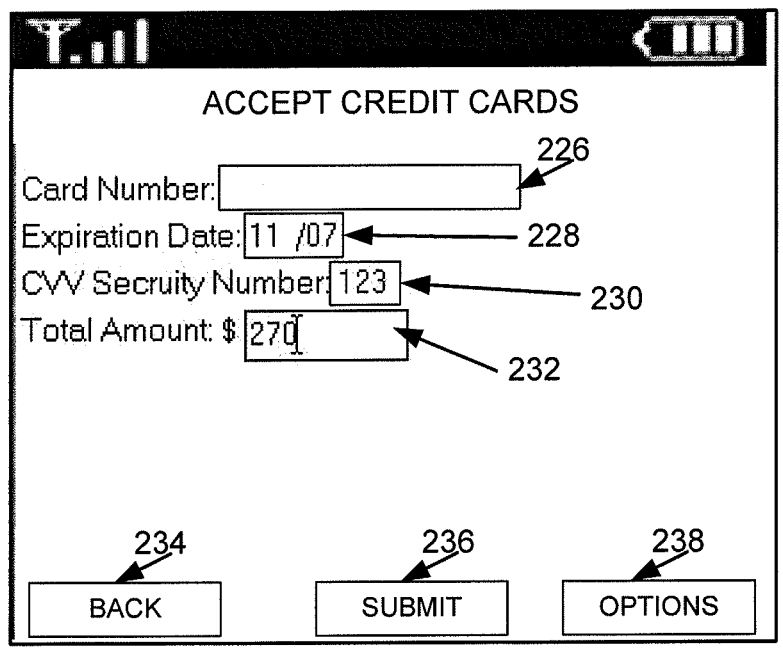
FIGS. 2D-2E are diagrams illustrating user interfaces from which to request a settlement with a payment card through a mobile phone.
Figure 2E:
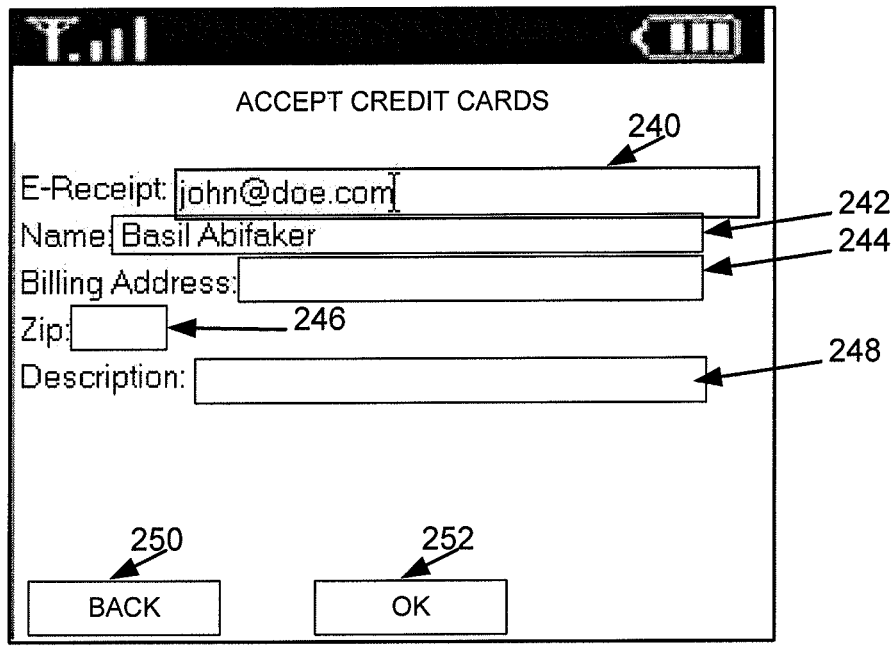

FIGS. 2D-2E are diagrams illustrating user interfaces from which to request a settlement with a payment card through a mobile phone. The user interface of FIG. 2D includes a combination of fields in which credit card information in combination with an amount of a transaction may be entered. For example, a first field 226 may be used to enter a credit card number, a second field 228 may be used to enter an expiration date of the credit card, a third field 230 may be used to enter a CVV security number, and a fourth field 232 may be used to enter an amount of a transaction. Other components of the user interface may be used to navigate, such as a first soft button 234 "back" that may be used to return to a previous user interface, a second soft button 236 "submit" that may be used to continue to a submit the credit card information or move forward to further user interfaces (such as the user interface of FIG. 2E), and a third soft button 238 "options" that may be used to see options of the client application. Interaction with the user interface may be performed, for example through a twelve button keypad (or a QWERTY keypad, if so-equipped). As another example, entering of a credit card number may be performed through the use of a card reading device that communicates with a mobile phone.

FIG. 2E includes a user interface in which further credit card information and information that may be used for an electronic receipt may be entered. In particular, the user interface includes a first text field 240 that may be used to enter an electronic mailing address or mobile phone number to which to send an electronic receipt, a second text field 242 that may be used to enter a name of a cardholder (which may be used for credit card verification), a third text field 244 that may be used to enter a billing street address (which may be used for credit card verification), a fourth text field 246 that may be used to enter a ZIP code (which may be used for credit card verification), a fifth text field 248 that may be used to enter a description (which may become part of a transaction record, including part of a paper or electronic receipt), a first soft button 250 that may be used to return to a previous user interface (e.g., the user interface of FIG. 2D), and a second soft button 252 that may be used to cause a request for settlement of a transaction with a credit card to be sent (e.g., from the client application a middleware server).

Figure 2F:
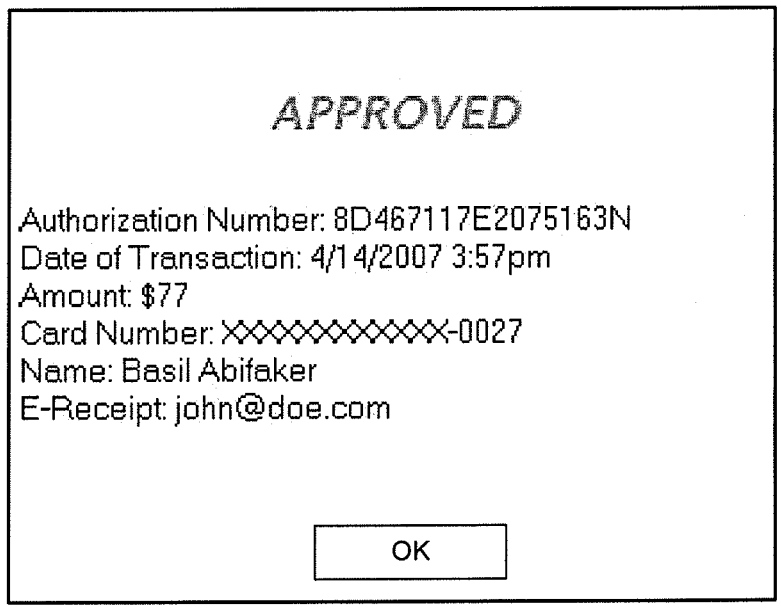
FIG. 2F is a diagram illustrating a user interface providing notification of acceptance of settlement with a payment card through a mobile phone.

FIG. 2F is a diagram illustrating a user interface providing notification of acceptance of settlement with a payment card through a mobile phone. In general, the user interface includes a variety of transaction data to identify a transaction, including an authorization number, a date and time of the transaction, an amount of the transaction, a last four digits of a credit card, a name of a cardholder, and an address at which an electronic receipt is to be sent. The user interface of FIG. 2F may be a result of a client application receiving from a middleware server, such as the middleware server 110, an indication that a settlement was completed.

Figure 2G:
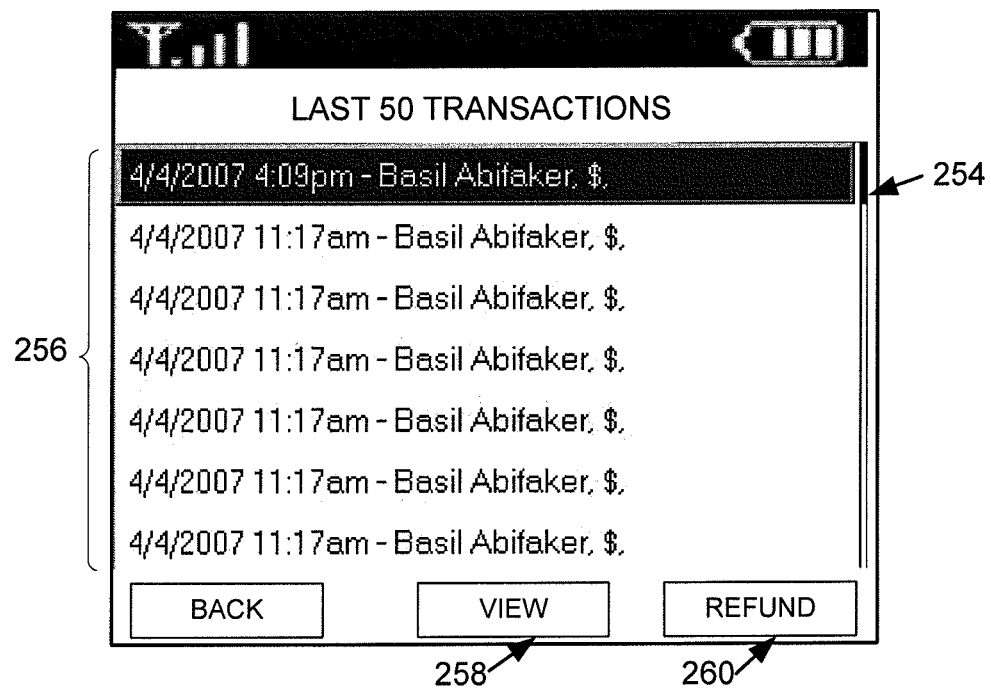
FIG. 2G is a diagram illustrating a user interface for browsing transaction data related to settlement with a payment card through a mobile phone.

FIG. 2G is a diagram illustrating a user interface for browsing transaction data related to settlement with a payment card through a mobile phone. In general, the user interface includes a list of a last fifty transactions, for which a portion transaction data may be stored on a mobile phone. The transaction data may be scrolled through, for example, using navigation buttons where scrolling may be indicated by the scroll bar 254. A list of the most recent transactions of the fifty is shown in a list 256. Items in the list 256 may be highlighted from which soft buttons may be used to perform actions associated with a particular transactions associated with a highlighted item. For example, the user interface includes a first soft button 258 that may be used to request viewing of details of a highlighted transaction (e.g., a date, amount, authorization number, name, address, ZIP code, electronic receipt, and description) and a second soft button 260 that may be used to request a refund of a highlighted transaction.

The list 256 may be a result of a separate of transaction data stored on a mobile phone and transaction data stored on a middleware server (or elsewhere not on a mobile phone). For example, the transaction data stored in the list 256 may be stored on a mobile phone and might be sufficiently nonsensitive information such that there is little or no security concern related to storing the information on the mobile phone. If a user requests to view detailed information of a transaction, additional data may be requested from a middleware server and displayed on the mobile phone. Upon exiting the client application or an additional, detailed view, the additional data may be deleted.

Although the user interfaces of FIGS. 2A-2G include a certain type and combination of user interface components, in implementations user interfaces may vary.

Figure 3:
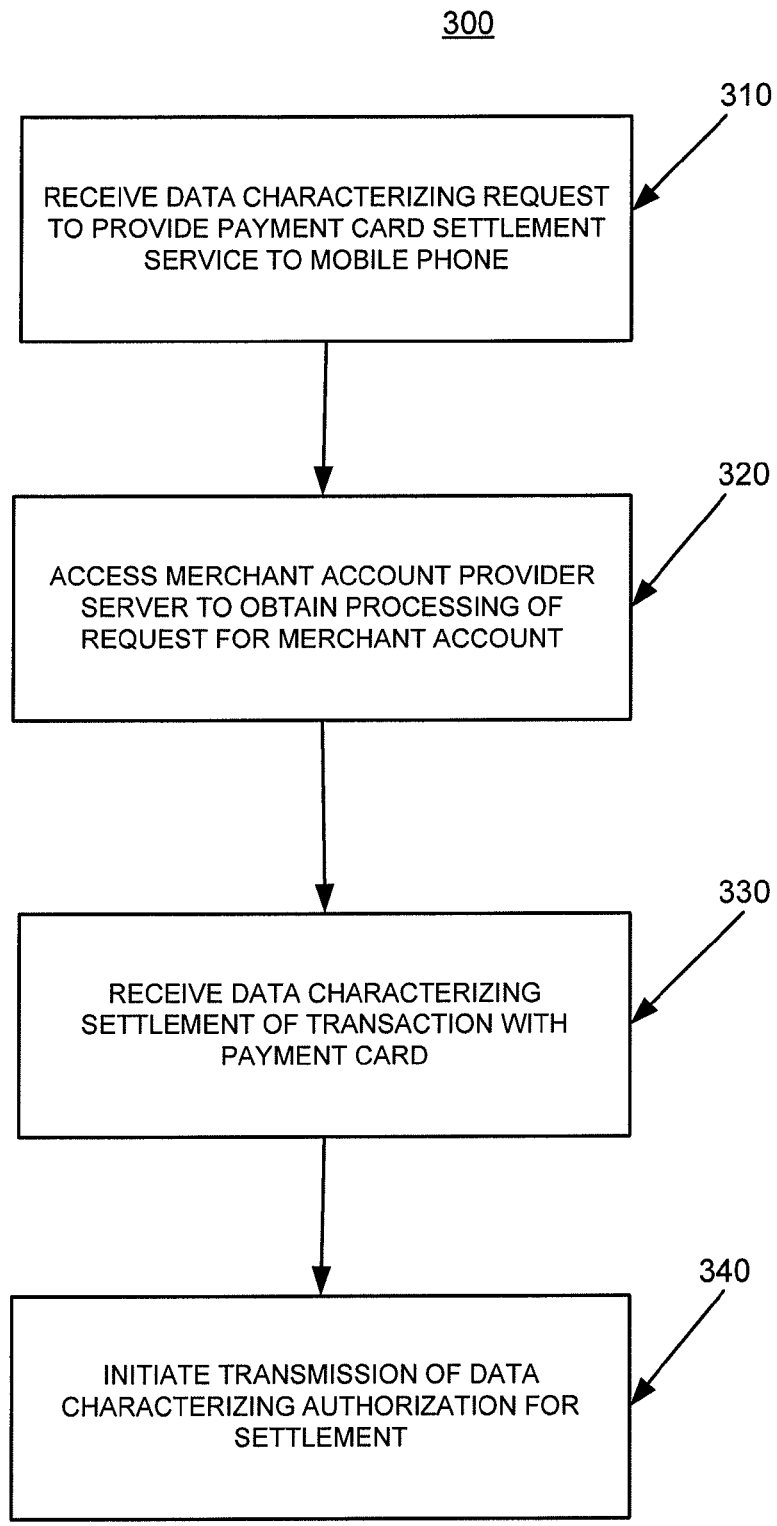
FIG. 3 is a flowchart illustrating processes to assist settling a transaction with a payment card.

FIG. 3 is a flowchart illustrating processes 300 to assist settling a transaction with a payment card. In general, the process 300 of FIG. 3 involves receiving data characterizing a request to provide a payment card settlement service to the mobile phone (310), accessing a merchant account provider server to obtain processing of the request for the merchant account (320), receiving data characterizing authorization to settle a transaction with a payment card (330), and initiating wireless transmission of data characterizing authorization for settlement (340). The sub-processes of the process 300 may be performed by an application server, such as the middleware server 110 of FIG. 1 or another application server (e.g., an application server that is collocated with a merchant account provider server; or a merchant account provider server, in variations).

Data characterizing a request to provide a payment card settlement service to a mobile phone is received (310). That data may be generated by a client application operating on a mobile phone and may be received from the mobile phone, through a carrier data network, at an application server. For example, the client application 106 may generate a message to be communicated with the middleware server 110 characterizing a request to settle a transaction. The connection between the client application and the application server may be a connection in accordance with TCP and SSL. The request may include payment card information and other transaction information, such as an amount of a transaction. The request may include merchant account information, such as authentication information to be used as credentials to access a merchant account.

A merchant account provider server is accessed to obtain processing of the request for the merchant account (320). The access may be performed by an application server. The connection between the application server and the merchant account provider server may be a connection in accordance with TCP and SSL. The access to an account may be based on et merchant account information that may be provided with a request to settle a transaction. For example, a mobile phone number and a PIN may be used as credentials to access an account of a merchant account provider at a merchant account provider server. Processing of the request may further involve parties beyond a merchant account provider. For example, a payment card association or processor may be contacted to request processing of a payment card.

Data characterizing authorization to settle a transaction with a payment card is received (330). The data may be received by an application server. The data may be from a merchant account provider server. The data may be generated by the merchant account provider server or another server (e.g., the merchant account provider server may relay a message including a notification of authorization to settle a transaction that is generated by a payment card processor). The connection between the application server and the merchant account provider server may be a connection in accordance with TCP and SSL.

Wireless transmission of data characterizing authorization for settlement is initiated (340). The wireless transmission may be initiated by an application server. The data may be wirelessly transmitted through a carrier data network to a mobile phone through a connection that may be in accordance with TCP and SSL. Information indicating authorization may be stored at the mobile phone (e.g., as part of a transaction history), displayed on the mobile phone (e.g., as a notice similar to the user interface of FIG. 2F), and the like.

Although the process 300 of FIG. 3 includes a certain number and type of sub-processes, implementations may vary. For example, implementations may include additional, fewer, or different sub-processes. As an example, an authorization for settlement might only be generated if a cardholder of a payment card authorizes a transaction by sending a message or responding via an IVR system to a message requesting confirmation to authorize a transaction involving the payment card (e.g., a client application may accept a mobile phone number of the cardholder that may be used to generate an SMS message to send to the device and the cardholder may respond; a mobile phone number may already be associated with a cardholder profile (e.g., at an issuer or payment card association) such that the number may be used by them to generate a response or the number be checked against a number used by a client application when requesting authorization and sending a message to the mobile phone number to request confirmation to authorize a transaction).

Aspects of the subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, embodied in a non-transitory computer-readable medium, the computer program product being operable to cause data processing apparatus to perform operations comprising:

receiving, from a first mobile phone, through a wireless carrier data network, at an application server, first data characterizing a request to provide a payment card settlement service, the first mobile phone being associated with a first mobile phone number, the request characterizing a payment card of a customer with which to settle a transaction and merchant account information of a merchant account;

accessing, by the application server, a merchant account provider server to obtain processing of the request for the merchant account based on the merchant account information, the merchant account information comprising the first mobile phone number;

receiving, at the application server and from the merchant account provider server, second data characterizing authorization to settle the transaction with the payment card for the merchant account;

associating the payment card with a cardholder profile for the customer, the cardholder profile comprising a second mobile phone with a second mobile phone number, the cardholder profile being stored at a computing system associated with an issuer of the payment card or a payment card association;

initiating, by the application server, wireless transmission of a request to authorize settlement of the transaction with the payment card, the request to be transmitted in accordance with a wireless mobile phone messaging protocol to the second mobile phone;

receiving, by the application server, a message generated by the second mobile phone characterizing customer-generated input authorizing settlement of the transaction; and initiating, by the application server, wireless transmission of third data characterizing the authorization for the settlement based on receiving the message authorizing the settlement of the transaction from the second mobile phone, the third data wirelessly transmitted through the wireless carrier data network to the first mobile phone.

2. A product in accordance with the product of claim 1, wherein at least one of the receiving the first data, the accessing, the receiving the second data, and the initiating transmission are performed by a middleware application on the application server.

3. A product in accordance with the product of claim 1, wherein the application server communicates over a connection in accordance with the Transmission Control Protocol and the Secure Sockets Layer protocol to the merchant account provider server.

4. A product in accordance with the product of claim 1, wherein the application server communicates over a connection in accordance with the Transmission Control Protocol and the Secure Sockets Layer protocol to the mobile phone.

5. A product in accordance with the product of claim 1, wherein the first mobile phone has a client application to transmit the first data and receive the third data on an operating system in accordance with BINARY RUNTIME ENVIRONMENT FOR WIRELESS.

6. A product in accordance with the product of claim 1, wherein the operations further comprise:

generating an electronic receipt of the settlement to be sent to the second mobile phone number or an electronic mail address.

7. A product in accordance with the product of claim 1, wherein the first mobile phone requires authorization with a personal identifying number and the operations further comprise:

receiving fourth data characterizing a request to view the merchant account at a web site, the request comprising authentication data comprising the personal identifying number and the first mobile phone number; and providing access to view the merchant account based on the authentication data providing authentication to view the merchant account.

8. A product in accordance with the product of claim 1, wherein the operations further comprise:

receiving fourth data characterizing a request to provide a refund for the transaction;

accessing the account provider to obtain processing of the request;

receiving fifth data characterizing completion of a refund; and transmitting sixth data characterizing the refund.

9. A product in accordance with the product of claim 1, wherein the merchant account information comprises authentication data.

10. A computer program product, embodied in a non-transitory computer-readable medium, the computer program product being operable to cause data processing apparatus to perform operations comprising:

receiving, at a first mobile phone of a merchant associated with a first mobile phone number, first data characterizing a second mobile phone number associated with a customer, a payment card and a settlement amount for a transaction, the first data being user-generated input;

initiating wireless transmission of second data characterizing a request to provide a payment card settlement service of a merchant account of a merchant account provider for the transaction, the wireless transmission to be from the first mobile phone over a carrier data network to an application server;

receiving, by the application server and from a payment card association server and via a merchant account provider server, data characterizing whether the payment card associated with the customer can be used to settle the transaction;

initiating by the application server, wireless transmission of a request to authorize settlement of the transaction with the payment card, the request to be transmitted in accordance with a wireless mobile phone messaging protocol to the second mobile phone using the second mobile phone number characterized in the first data;

receiving by the application server a message generated by the second mobile phone characterizing customer-generated input authorizing settlement of the transaction; and wirelessly receiving third data characterizing authorization of settlement of the transaction with the payment card, the third data wirelessly received by the first mobile phone from the application server based on receiving the message authorizing the settlement of the transaction from the second mobile phone.

11. A product in accordance with the product of claim 10, wherein the first mobile phone has a client application to transmit the first data and receive the third data on an operating system in accordance with BINARY RUNTIME ENVIRONMENT FOR WIRELESS.

12. A product in accordance with the product of claim 10, wherein the operations further comprise:

requesting an electronic receipt of the authorization of the settlement to be sent to the second mobile phone number or an electronic mail address.

13. A product in accordance with the product of claim 10, wherein the first mobile phone requires authorization with a personal identifying number to be used with the mobile phone number to access a web site to manage the merchant account of the merchant account provider.

14. A product in accordance with the product of claim 10, wherein the product is available for over-the-air download to a mobile phone.

15. A computer-implemented method comprising:

receiving by a middleware server payment requests initiated by mobile phones of corresponding merchants, the mobile phones operating on a plurality of heterogeneous wireless communication networks, the payment requests each specifying respective transaction amounts, payment card account numbers, and mobile phone numbers for the corresponding customer;

associating each payment request with one of a plurality of merchant account provider servers;

converting formats of the payment requests to formats of the corresponding merchant account provider server;

transmitting the converted payment requests to the corresponding merchant account providers;

receiving authorizations for at least one of the payment requests from at least one of the corresponding merchant account providers;

associating the authorizations with mobile phones corresponding to the authorizations based on the mobile phone number specified in the request;

initiating interactive voice response telephone calls in connection with each payment request to seek authentication of such request from a customer;

generating compatible notifications for each of the authorizations if spoken input obtained via the interactive voice response telephone calls matches pre-defined authentication criteria; and initiating wireless transmission of the notifications to the corresponding mobile phones.

16. A product in accordance with the product of in claim 1, wherein the operations further comprise:

checking, by the application server, the second mobile phone number matches a telephone number associated with the subscriber in a cardholder profile.

17. A product in accordance with the product of in claim 1, wherein the request to authorize settlement of the transaction with the payment card comprises a messaging protocol message describing the transaction and requesting a reply via the messaging protocol approving or rejection the transaction.

* * * * *